July 11, 1939.   A. J. DESING   2,165,460
ADJUSTABLE LENGTH LEVER
Filed May 27, 1937
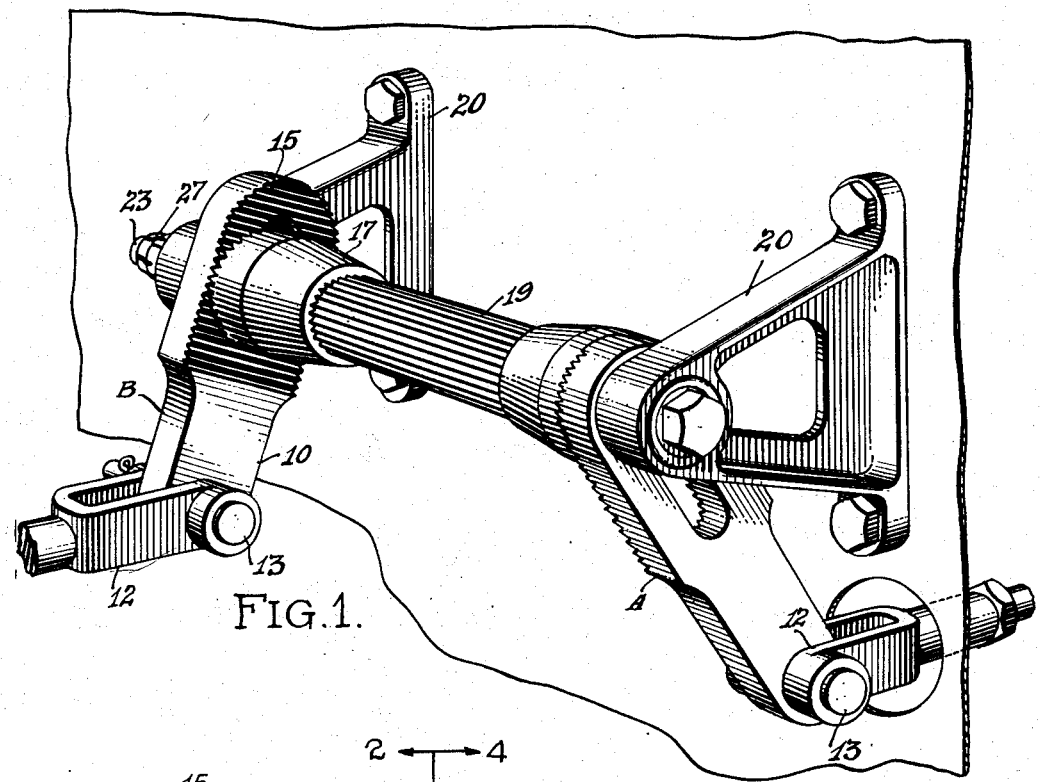
FIG.1.
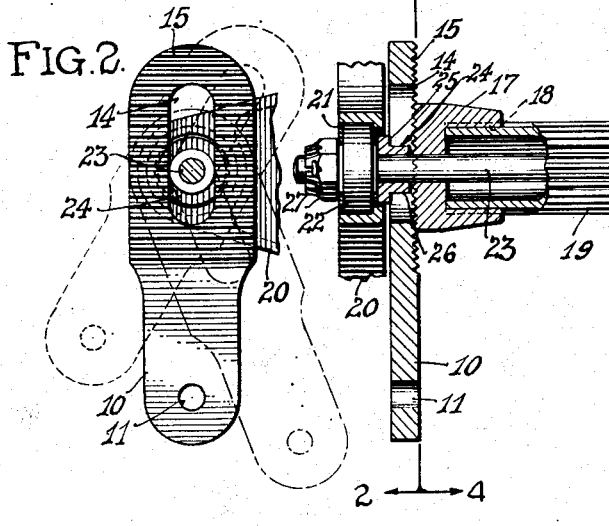
FIG.2.
FIG.3.
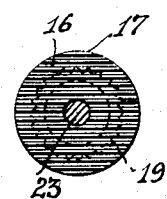
FIG.4.
INVENTOR
ARTHUR J. DESING.
BY
ATTORNEY Patented July 11, 1939

2,165,460

UNITED STATES PATENT OFFICE 2,165,460

ADJUSTABLE LENGTH LEVER

Arthur J. Desing, Buffalo, N. Y., assignor to Curtiss-Wright Corporation, a corporation of Delaware Application May 27, 1937, Serial No. 144,988

3 Claims. (Cl. 287—52.02)

This invention relates to improvements in control lever mechanisms, and constitutes, in effect, devices to augment the utility and flexibility of the control lever arrangement disclosed in the Hathorn patent No. 1,990,990.

In said patent, is shown and described an adjustable control lever and shaft organization particularly adapted for use in connection with aircraft engine controls, wherein a splined shaft may be cut to any convenient length according to the installation, and wherein lever fittings and bearing fittings may be assembled upon the shaft in the proper position as dictated by the range of movement required therefor. The splined shaft and lever fittings permit of the positive rotational lock between the shaft and fitting.

This invention contemplates an improvement over said prior patent by providing, as standard articles, lever hub and lever elements which are not only adjustable rotationally, as in the prior patent, but which additionally may be adjusted for varying effective lengths of the levers.

An object of the invention is to provide, as a pre-fabricated article, an adjustable length lever suitable for use in a variety of environments, wherein the effective length of the lever may be readily established upon assembly of the articles, and wherein, once assembled, the length of the lever remains constant, and wherein the lever is positively located. A further object is to provide a device which may find relatively universal application in control systems, wherein a plurality of identical lever and hub organizations may be used for a variety of different purposes under circumstances where the length of the several levers are divergent.

Further objects will be apparent from a reading of the subjoined specification and claims, together with an examination of the accompanying drawing, in which similar numbers indicate similar parts, and in which:

Fig. 1 is a perspective view of an installation of control levers according to the invention;

Fig. 2 is an end elevation of one of the lever units, showing the serrations for the adjustment thereof, comprising a section on the line 2—2 of Fig. 3;

Fig. 3 is a side view, partly in section, showing a lever and hub assembly as applied to a splined shaft, and Fig. 4 is a section on the line 4—4 of Fig. 3.

In the assembly of aircraft power plant controls, it is frequently necessary to utilize push-pull rods for positive actuation for engine units to be controlled. According to the various arrangements of power plants in aircraft, and differences in the detail design of the several units, it has previously been necessary to provide control lever units, cooperating with push-pull rods, wherein the levers are individually fabricated articles having center distances and proportions in accordance with the particular requirements. Where a plurality of different levers are used in an installation, it is apparent that a large number of different small parts are needed, which tends to increase the cost of the installation. The provisions of the invention permit of the use of a single standardized lever which may be adjusted for effective lever length, so that the standard lever may be adapted for a plurality of purposes. The lever 10 is provided at one end with an opening 11, to which a clevis 12 may be pivotally attached by a pin 13. The opposite end of the lever is provided with an elongated slot 14, and that face of the lever normal to the slot axis is laterally serrated as at 15 throughout a substantial portion of the lever length. The serrations 15 are engageable with corresponding serrations 16 on a hub element 17, the latter being internally splined as at 18 for fitting engagement upon an externally splined tube 19. In assembly of the apparatus, brackets 20 are provided with sockets 21 for ball bearings 22, the inner race of the bearings engaging a rod 23 passing through the lever 10 and tube 19 to hold the assembly together. The inner race of the bearing 22 engages a shouldered washer 24, the shoulder of which rests upon the outer face 25 of the lever 10, while the smaller portion 26 of the washer engages within the slot 14. When the rod 23 is clamped by a nut 27, the washer 24 holds the lever 10 in firm engagement with the hub element 17, positively holding the serrations 15 and 16 in engagement in whatever position in which they may have been adjusted. If it is necessary to have a long throw for the lever, the same may be adjusted to the position A in Fig. 1, while if the throw of the lever is desired to be short, it may be adjusted to the position B in Fig. 1.

By virtue of the adjustable lever length, and the adjustable rotational position of the hub 17 with respect to the tube 19, it will be obvious that practically innumerable adjustment positions are afforded by the use of standardized components, eliminating the necessity of providing a plurality of different designs of lever elements for various positions in the power plant installation.

Fig. 2, in dotted lines, shows alternative positional relationships for the lever 10 with respect to the tube 19.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A lever assembly comprising, in combination, a splined shaft, an internally splined hub member engageable in any one of a plurality of rotational positions relative to said shaft, the splines of respective members being drivably engageable with one another, said hub member having parallel serrations across one end face thereof, a lever having horizontal serrations engageable in a plurality of positions with the end serrations on said hub member, and means to clamp said hub member and said lever together.

2. A lever assembly including a shaft having splines, a hub element internally splined for engagement with the shaft splines in any one of a plurality of positions, said hub element having lateral serrations across an end face thereof, a lever, slotted to embrace a portion of the shaft, and having lateral serrations for engagement with the hub serrations in any one of a plurality of positions, and means to retain said lever and hub in assembled relationship.

3. A lever assembly comprising a shaft and a hub having inter-engaging means disposed for relative non-rotational engagement in any one of a plurality of co-axial positions of the hub and shaft, a lever movable substantially radially along an end face of said hub, and means to lock said lever in any one of a plurality of radial positions upon the hub, said lever and hub having inter-engaging means for fixing the radial location when the hub and lever are locked together, said lever being slotted to embrace a portion of said shaft.

ARTHUR J. DESING.